UNITED STATES PATENT OFFICE.

JOHN RILEY, OF TROY, NEW YORK, ASSIGNOR TO "THE UNITED STATES AND FOREIGN SALAMANDER FELTING COMPANY."

IMPROVEMENT IN COMPOSITIONS FOR COVERING STEAM-BOILERS, &c.

Specification forming part of Letters Patent No. 114,711, dated May 9, 1871.

*To all whom it may concern:*

Be it known that I, JOHN RILEY, of city of Troy, county of Rensselaer and State of New York, have invented a new and useful Composition or Cement for the Covering or Coating of Steam-Boilers, Furnaces, and similar articles, to prevent the radiation of heat from the same, and for filling safes, refrigerators, and similar articles, to prevent the absorption of heat within the same.

The nature of my invention consists in the employment of a combination of asbestus and lime-putty, either with or without the other ingredients hereinafter named, as a coating for steam-boilers and pipes and filling safes and refrigerators, or any other article where it is desirable to prevent the radiation or absorption of heat.

To enable others skilled in the art to which it relates to make and use my said invention, I will describe the method of preparing and using the same, which is as follows:

I usually and preferably compose the said cement of four parts, by measurement, of asbestus, eight parts of lime-putty, two parts of charcoal, and two parts of ground or crushed pumice-stone. I take the asbestus of commerce, and, by means of rollers or other suitable machinery, crush it to a fiber. I then mix the same with lime-putty to the consistency of wall-mortar, adding, at the same time, the charcoal and pumice-stone in their proportions, and the entire mass is worked until all the ingredients are well incorporated.

In certain cases, when the heat of the article coated is not intense, the charcoal or pumice-stone, or both, may be partly or entirely dispensed with; but in the majority of cases it is better to use all of the ingredients above mentioned in the full proportion named.

This composition may be applied to the outer surface of boilers, furnaces, steam-pipes, and the like, by a trowel or any other similar instrument, or to the inside of fire-boxes; or it may be molded like fire-clay and used for the lining of fire-boxes in the same manner as fire-brick.

It may also be used for the filling of safes, undertakers' boxes, or refrigerators, or any other similar articles, and will be found effectual in all cases to prevent the radiation or absorption of heat.

What I claim as new, and desire to secure by Letters Patent of the United States, is—

1. An improved composition for coating the exterior of steam-boilers, pipes, or other heated surfaces, and for filling safes, refrigerators, and similar articles, composed of asbestus, lime-putty, charcoal, and pumice-stone, (or their equivalents,) combined and prepared as herein specified.

2. A composition for coating the exterior of steam-boilers, pipes, and other heated surfaces, and for filling safes, refrigerators, and similar articles, composed of asbestus and lime-putty, combined and prepared as herein specified.

3. The employment of asbestus, when crushed to a fiber and mixed with lime-putty, as a material for coating the exterior of steam-pipes, boilers, and other heated surfaces, and filling safes, refrigerators, and similar articles, for the purposes hereinbefore specified.

In testimony whereof I have hereunto set my hand this 28th day of May, A. D. 1870.

JOHN RILEY.

Witnesses:
FRANCIS A. WOODS,
C. D. KELLUM.